United States Patent [19]

Guazzo

[11] Patent Number: 4,753,500
[45] Date of Patent: Jun. 28, 1988

[54] JOINING TWO OPTICAL FIBER SUBMARINE CABLE ENDS

[75] Inventor: Lucien Guazzo, Calais, France

[73] Assignee: Les Cables de Lyon, Clichy Cedex, France

[21] Appl. No.: 384,375

[22] Filed: Jun. 2, 1982

[30] Foreign Application Priority Data

Jun. 5, 1981 [FR] France .................... 81 11156

[51] Int. Cl.$^4$ .................... G02B 6/36; G02B 7/26
[52] U.S. Cl. .................... 350/96.20; 350/96.21
[58] Field of Search .................... 350/96.20, 96.21

[56] References Cited

U.S. PATENT DOCUMENTS

| | | | |
|---|---|---|---|
| 4,171,867 | 10/1979 | Cocito | 350/96.21 |
| 4,339,171 | 7/1982 | Makuch et al. | 350/96.20 |
| 4,373,777 | 2/1983 | Borsuk et al. | 350/96.20 |

FOREIGN PATENT DOCUMENTS

| | | |
|---|---|---|
| 2505027 | 2/1975 | Fed. Rep. of Germany. |
| 2026200 | 1/1980 | United Kingdom. |
| 1595455 | 8/1981 | United Kingdom. |

*Primary Examiner*—William L. Sikes
*Assistant Examiner*—Robert E. Wise
*Attorney, Agent, or Firm*—Sughrue, Mion, Zinn, Macpeak & Seas

[57] ABSTRACT

Each of the cables comprises an axial compartment (3, 3') housing the fibers, a steel wire armoring (5, 5') wound around said compartment, a copper tube (9, 9') shrink-fitted over the armoring, and an outside jacket (13, 13'). The center section of said device comprises a mandrel (1) around which the fibers are wound, and a metal sleeve (8) surrounding it with some play. The lateral sections of the device each comprise a metal anchoring part (6, 6') one end thereof having a bore hole (6A, 6A') for inserting the steel wires and the other end a bore hole (14, 14') for inserting the copper tube and the cable jacket, a conical ring (7, 7') for flaring and securing the steel wires, a hard-setting resin filler (12, 12') between the anchoring part and the conical ring, and a resin hood (10, 10') surrounding the end of the anchoring part.

10 Claims, 2 Drawing Sheets

JOINING TWO OPTICAL FIBER SUBMARINE CABLE ENDS

FIELD OF THE INVENTION

The invention described herein relates to the joining of two optical fiber submarine cable ends, where each cable comprises an axial compartment housing the optical fibers, an armoring of steel wires helically applied over this compartment, a copper tube swaged over the armoring, and an outside insulating jacket. It also concerns a method of manufacturing such a junction.

Said junction concerns joining two cable ends during the laying of a submarine transmission line, or repairing a damaged section of cable.

BACKGROUND OF THE INVENTION

Optical fiber submarine cables generally comprise a core member carrying the optical fibers (placed in plastic tubes filled with a viscous compound or in helical grooves on the outside of a metal or plastic rod), and an armoring of spirally wound steel wires covered with a tube of ductile, conductive metal (copper or aluminum) welded longitudinally and swaged over the steel wire armoring, and finally, an insulating jacket made of a thermoplastic material such as polyethylene.

Connecting two cable ends of this makeup is difficult, for it is necessary to do all of the following:
  fuse or stick together end-to-end the optical fibers in the two cables, while leaving enough slack to avoid fiber breakage from longitudinal stress;
  ensure mechanical continuity of the two cables' armorings through the junction by supporting the tensile stress undergone by the cable during its handling;
  ensure watertightness of the junction, even under the high pressure conditions of ocean bottoms.

Up to now, no technique has been proposed to simplify, rationalize and speed junction operations for such cables, despite the inherent slowness of a trial-and-error manual operation and the doubts which it involves with respect to mechanical strength and watertightness of the junction.

The present invention is intended to remedy these inconveniences, and to provide a junction method of assembling it, providing good mechanical strength and good watertightness for the junction, while speeding the jointing of the two cable ends and leaving enough slack in the optical fiber to ensure that the fibers will absorb large variations in length or tension, or a torsional stress.

SUMMARY OF THE INVENTION

The present invention provides a junction comprising:
  (a) a center section comprising:
    (i) a mandrel or tube around which are wound the optical fiber ends, which are individually fused or connected together, said mandrel having a central through-hole in which the ends of the optical fiber axial compartments are inserted,
    (ii) a high-strength metal sleeve surrounding the mandrel, with some play, having internal threads at both ends,
  (b) a lateral section, on each side of the center section, comprising:
    (i) an anchoring part made at least partly of high-strength metal, having a tapered cylinder bore on the side facing the center section for the passage and lodging of the ends of the steel wires forming the armoring, and on the opposite side, a cylindrical bore of larger diameter for lodging the copper tube and the outside insulating jacket, part of whose outside face is threaded so as to be fitted into the internal thread of the mandrel end,
    (ii) a conical ring for flaring and securing the steel armoring wires, into which has been drilled an axial through-hole for the passage of the axial optical fiber compartment,
    (iii) a hard-setting synthetic resin filling occupying the empty space between the inside surface of the anchoring part and the outside surface of the conical flaring ring, and
    (iiii) a hood of synthetic resin surrounding the end of the anchoring part, which connects with the cable jacket.

The junction preferably includes one or more of the following features:
  a heat-shrinkable sheath around the junction between the sleeve of the center section and each of the hoods of the lateral sections;
  a heat-shrinkable sheath around the junction between the hook of each lateral section and the jacket of the corresponding cable;
  the cylindrical section of the tapered cylindrical bore of the anchoring part is fitted with a gasket preventing the penetration of any synthetic resin prior to said resin's hardening; and
  at least the inside area of the anchoring parts coming into contact with the steel wires is made of an electrically insulating ceramic material.

In the method for assembling a junction in accordance with the invention,
  (a) the steel wires of the armoring, as well as the swaged copper tube and the outside jacket of the cable ends, are eliminated from the area of the junction over a length notably greater than the length required for said device, exposing the bare optical fibers,
  (b) the synthetic resin hoods, the anchoring parts and the metal sleeve are successively engaged over the ends of the optical fiber compartments,
  (c) the steel wires of the armoring, the swaged copper tube and the jacket are cut to the length required for the device,
  (d) a certain amount of hard-setting synthetic resin filler is introduced in the conical section of the tapered cylindrical bore of the anchoring parts and the ends of the steel armoring wires are flared out inside of said conical section,
  (e) the conical steel armoring wire flaring parts are introduced into the anchoring parts; the entire space between the anchoring parts, the ends of the steel wires and the conical flaring parts is filled with synthetic resin filler; then the synthetic resin is made to harden,
  (f) the optical fibers required to be joined are fused and their length of slack in relation to the length of the device is wound around the mandrel or tube,
  (g) the metal sleeve is pulled back over the center section of the device and screwed onto the two anchoring parts,
  (h) the synthetic resin hoods are made to slide up to contact with the metal sleeve.

Preferably, heat-shrinkable sheaths are engaged on the ends of the optical fiber compartments before the synthetic resin hoods and shrunk by heating above the contact surface between the hoods and the metal sleeve, following installation of the hoods, and/or heat-shrinkable sheaths are engaged over the ends of the optical fiber compartments before the synthetic resin hoods and shrunk by heating above the contact area between the hoods and the cable jackets.

BRIEF DESCRIPTION OF THE DRAWINGS

A non-limiting example of a junction in accordance with the present invention and a method of making such a junction are described below, with reference to the figures of the appended drawing.

FIG. 1A is a longitudinal sectional view of the section of the junction to the left of the XX axis of FIG. 1.

FIG. 1B is a longitudinal sectional view of the section of the junction to the right of the XX axis of FIG. 1.

MORE DETAILED DESCRIPTION

Figure 1:
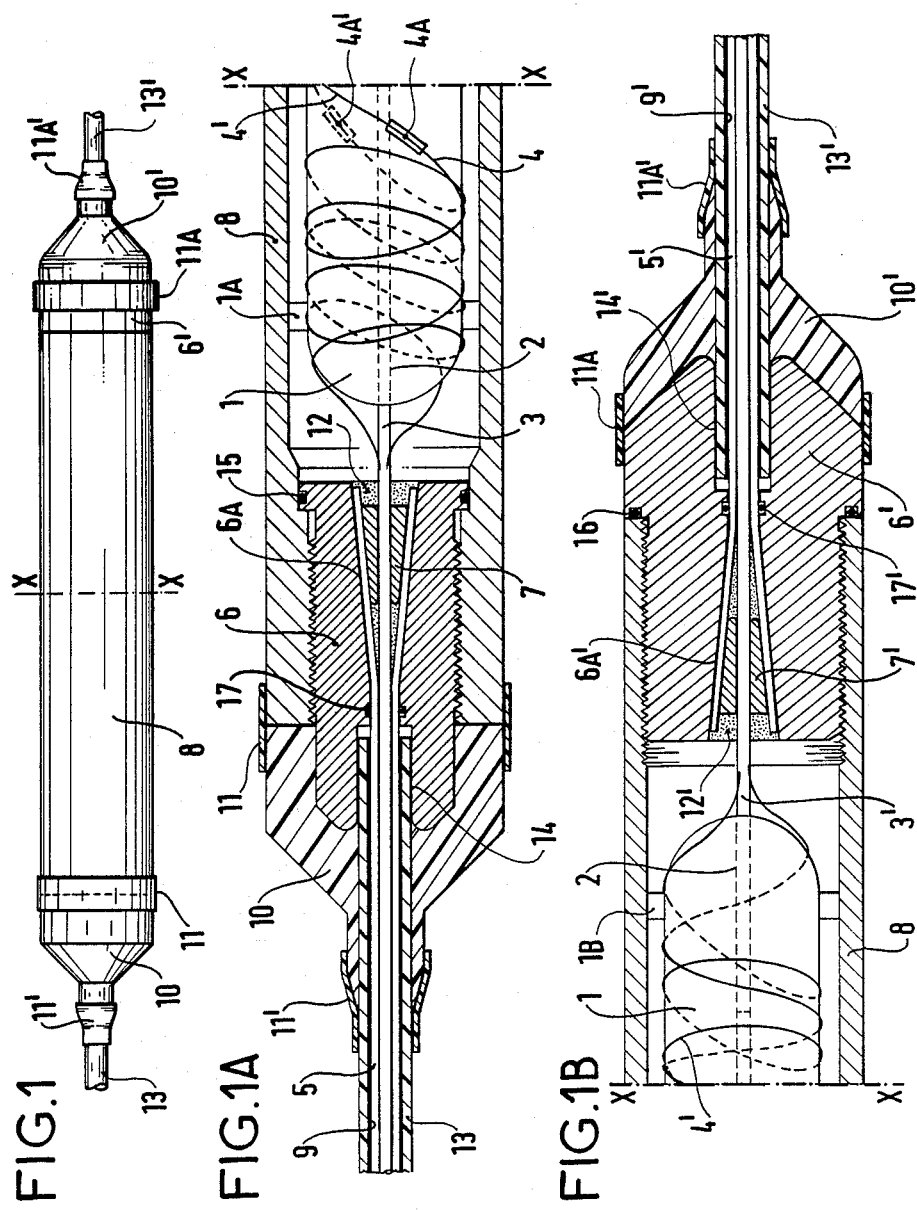
FIG. 1 is an elevation view of a junction as a whole.

In FIG. 1, are shown the outside metal sleeve 8 of the junction, two polyethylene end hoods 10, 10', and heat-shrinkable sheaths 11, 11' on the left hand end and 11A, 11A' on the right hand end, devised to provide sealing both of the contact surface between the metal sleeve and the end hoods, and of the joining of the hood with the cables' outside jacket.

As can be seen in FIGS. 1A and 1B, the junction comprises an axial mandrel 1, in which a center through-hole has been drilled to fit the ends 3,3' of the cable core containing the optical fibers (such as plastic tubes filled with a viscous compound, or metal or plastic rods cut with helical grooves to receive the optical fibers). This mandrel is held in place inside the sleeve by studs 1A, 1B, allowing some play. The optical fibers such as 4, 4' are wound around the mandrel 1, fused end to end and the fused joints protected by small metal or plastic sleeves 4A, 4A'.

Wherefrom, in the event of a tensional or torsional stress on the junction device, the optical fibers can absorb the stresses by sliding around the mandrel.

The steel wires of the cables' protective armorings 5, 5' are secured by flaring between the inside tapered cylindrical or conical bores 6A, 6A' of the two steel anchoring parts 6, 6' and the conical outside wall of two conical supporting rings 7, 7', the latter having themselves been drilled through longitudinally to allow the cable cores 3, 3' to be passed through.

It is noted that the anchoring parts 6, 6' are not symmetrical, part 6 has a smaller threaded outer diameter than the corresponding threaded outer diameter of part 6', in order to facilitate assembling the junction, as will be made clear later on.

The space remaining between the anchoring parts, the supporting rings and the steel wires is filled with a thermo-setting epoxy resin 12, 12', which prevents any slippage of the latter after their installation. The anchoring parts 6, 6' are threaded over the better part of their outside surface, toward the middle of the device, and screwed into the internal threads in the ends of the steel sleeve 8. The latter is not symmetrical, also to ease fitting, as was pointed out with respect to the anchoring parts.

The copper tubes 9, 9' swaged over the steel wire cable armorings, and the polyethylene outside jackets 13, 13' covering the tubes, are inserted into the cylindrical housings of the anchoring parts' cable-side end pieces. Sealing continuity between the outside cable jackets and the anchoring parts is provided by polyurethane hoods 10, 10'. The joints between the sleeve 8 and these hoods are protected from any residual leakage which might occur by means of heat-shrinkable sheaths 11', 11A', O-rings 15, 16 provide sealing between the sleeve and the anchoring parts, downstream from the threads (15) as concerns the left hand anchoring part, which part is not in contact with the surrounding water, and upstream from the threads (16) as concerns the right hand anchoring part, which part is in contact with the surrounding water.

Finally, O-rings 17, 17' are fitted into the axial throughholes of the anchoring parts 6, 6', between their conical bores and the housings 14, 14' for the copper tubes and the cable jackets. The purpose of these O-rings is to prevent the egress of epoxy resin via the conical bores at the time when the latter is being made to fill the gap between the anchoring parts, the steel wires and the supporting rings 7, 7'.

Alternatively, the outside sleeve can be symmetrical in relation to the two anchoring parts, in which case its left hand section will be as in FIG. 1B.

The anchoring parts 6, 6' can also be made partly of an insulating ceramic material, especially if one seeks to electrically isolate the optical core member and the steel wires from the outside sleeve, so as to facilitate the transmission of remote power supply current for the repeaters and separate its potential from that of the surrounding water.

Figure 2:
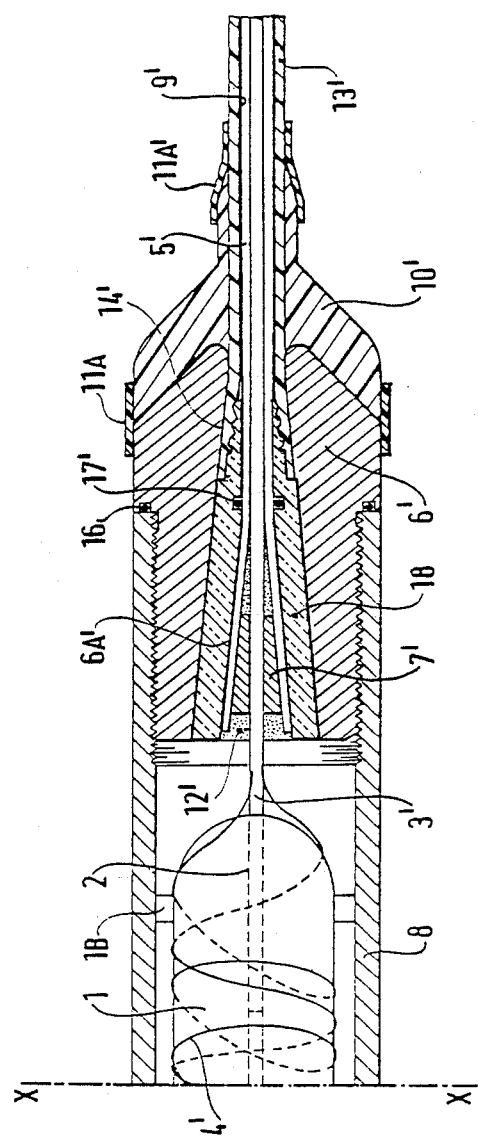
FIG. 2 is a longitudinal sectional view of the same part of the junction to the right of the XX axis of FIG. 1, wherein however the outside section of the anchoring part is made of a ceramic material.

FIG. 2 thus shows the same section of the junction to the right of the XX axis of FIG. 1, in which however, the inside section 18 of the anchoring part 6 is made of an electrically insulating ceramic material, which insulates the optical core and the steel wire armoring from the external sleeve 8, thus facilitating the transmission of remote power supply current to the repeaters and isolating them from the ocean potential.

The junction just-described is assembled as follows:

The steel armoring wires 5 of the cable ends are stripped off over the length required by the inside cavity of the metal sleeve.

The copper tubes swaged over the steel wires 9 and the outside jackets of the cables are also stripped off over a somewhat greater length, according to the length of the anchoring parts.

The heat-shrinkable sleeves 11, 11', 11A, 11A', the polyethylene hoods 10, 10', the steel anchoring parts 6, 6' fitted with their gaskets, and the outside steel sleeve 8 are fitted one after the other over the optical fiber carrying cores, as far as they will slide.

Whereafter the optical fibers 4, 4' are stripped over a length equal to the slack required for the connection.

The steel wires are then flared out inside the conical bores of the anchoring parts after having previously filled the latter with a small amount of hot epoxy resin; the conical rings 7, 7' used to flare the steel wires are inserted between said wires, such that the optical fiber cores 3, 3' pass through the center holes of the two rings. Filling of the space between the anchoring parts, the wires and the securing rings is completed, then the whole assembly is heated from the outside to polymerize and harden the resin and secure the steel wires inside the anchoring parts.

The optical fibers to be connected are then fused together by twos and their slack is wound spirally around the mandrel 1, which is centered over the two ends of the optical fiber carrying cable cores inserted into its axial through-hole. The fusion joints are covered with the protective sleeves 4A, 4A'.

The outside steel sleeve 8 is screwed onto the left hand anchoring part 6 equipped with an O-ring 15, then is pulled back over the junction once the supporting studs 1A, 1B have been installed, and is screwed onto the right hand anchoring part 6', which is fitted with O-ring 16.

The polyethylene hoods are then slipped up to contact with the steel sleeve, then the heat-shrinkable sleeves are installed and heated so as to seal the connected surfaces. The junction s thus completed.

Although the junction and the method of assembling it just-described with reference to the figures of the drawing appear to be the best embodiment of the invention, it is understood that certain modifications may be made to them without going beyond the scope of the invention, as certain components of the device or certain steps of the procedure may be replaced by others which would yield a similar result in technical terms. Specifically, one can substitute for the threaded fitting of the outside sleeve on the anchoring parts a fitting with screws or tenons force-fitted or screwed into the body of the anchoring parts. The outside sleeve can be symmetrical with respect to the two anchoring parts, in which case both of its ends would look like the drawing of FIG. 1B. The securing rings for the steel wires can be shaped as dual cones rather than simple cones.

it is also possible to replace the mandrel designed to receive the connected ends of the fibers by a tube which would be supported by shoulders built on the inside faces of the two anchoring parts.

Furthermore, in the case wherein these anchoring parts are made entirely of metal, it would be necessary, in order to provide for the remote powering of repeaters, to isolate the anchoring parts and the outside metal sleeve from the outside by means of an insulating sheath made from an electrically insulating synthetic meaterial, such as polyethylene.

Protection against water penetration can be further enhanced by filling the interior space in which the fibers are connected with a water impervious liquid (such as polyisobutylene).

Finally, watertightness can be further improved by means of more efficient seals being inserted between the cable and the inlet to the junction box.

I claim:

1. Junction between two optical fiber submarine cable ends capable of maintaining a water-tight connection while under high pressure conditions on the ocean bottom and capable of insuring mechanical continuity while being subjected to high tensile stress during submarine cable laying, where each cable comprises an axial compartment housing the optical fibers, an armoring of steel wires helically wound around said compartment, a copper tube swaged over the armoring, and an outside insulating jacket, said junction comprising:
   (a) a center section comprising:
      (i) a mandrel, the ends of the optical fibers being wound around the mandrel and being fused or connected to one another individually, said mandrel having a center through-hole, the ends of the axial compartments housing the optical fibers being inserted within said center through-hole,
      (ii) a sleeve of high-strength metal surrounding the mandrel with some play, both ends of said sleeve being internally threaded,
   (b) a lateral section comprising, on each side of the center section,
      (i) an anchoring part at least partly made of high-strength metal, having a conical bore on the side facing the center section, said steel armoring wires inserted therein, said anchoring part on the opposite side, having a larger-diameter cylindrical bore, the copper tube and the outside insulating jacket being secured therewithin, and said anchoring part being threaded over part of its outside area and assembled with the internal threading of the sleeve end,
      (ii) a conical ring positioned within said conical bore of said anchoring part and flaring and securing the steel wires of the armoring therebetween, said conical ring having an axial through-hole, said axial through-hole receiving the optical fibers,
      (iii) a hard-setting synthetic resin filler occupying the free space between the inside surface of the anchoring part and the outside surface of the conical flaring ring, around the ends of the steel armoring wires, and
      (iiii) a hood made of synthetic resin surrounding the end of the anchoring part, for connecting to the cable jacket;

whereby, said junction between said submarine cable ends has improved connection reliability and watertightness.

2. A junction as claimed in claim 1, furthermore comprising a heat-shrinkable sheath around the joint between the sleeve of the center section and each of the hoods on the side sections.

3. A junction as claimed in claim 1, further comprising a heat-shrinkable sheath around the joint between the hood on each side section and the corresponding cable jacket.

4. A junction as claimed in claim 1, wherein the cylindrical part of the tapered cylindrical bore of the anchoring part is fitted with a gasket preventing the penetration of synthetic resin filler through this point prior to the hardening of said resin.

5. A junction as claimed in claim 1, wherein at least the center area of the anchoring parts in contact with the sleeve is made of an electrically insulating ceramic material.

6. A junction according to claim 1, wherein the anchoring parts have different outer threaded diameters and the inner threaded ends of said sleeve are of different inner diameters matching respectively the outer diameters of said anchoring parts and being threaded thereto.

7. A method for assembling a junction for joining the ends of two optical fiber submarine cable ends, comprising the steps of:
   (a) eliminating the steel wires of the armoring, as well as the shrink fitted copper tube and the outside jacket of the cable ends from the junction area over a length which is notably greater than that required for said device, thus baring the optical fibers,
   (b) engaging the hoods of synthetic resin, the anchoring parts and the metal sleeve one after the other on the ends of the optical fiber cables, (c) cutting the steel armoring wires, the swaged copper tube and the jacket to the length required for the device, (d) introducing a certain amount of hard-setting synthetic resin filler into the conical part of the tapered-cylindrical bore of the anchoring parts and flaring the ends of the steel armoring wires inside said conical part, (e) inserting the conical parts used to flare the steel armoring wires into the anchoring parts; filling the entire space included between the anchoring parts, the ends of the steel armoring wires and the conical flaring parts with synthetic resin filler, and following by heating the whole assembly to harden the synthetic resin, (f) fusing the optical fibers to be connected and winding their slack in relation to the length of the device around the mandrel or tube, (g) pulling the sleeve back over the center section of the device and screwing the sleeve onto the two anchoring parts, and (h) sliding back the hoods of synthetic resin until they come into contact with the metal sleeve.

8. A method as claimed in claim 7, wherein heat-shrinkable sheaths are pulled over the ends of the optical fiber compartments, prior to the synthetic resin hoods, whereupon they are shrunk by heating above the area of contact between the hoods and the metal sleeve, following installation of the hoods.

9. A method as claimed in claim 7, wherein heat-shrinkable sheaths are pulled over the ends of the optical fiber compartments before the synthetic resin hoods, whereupon they are shrunk by heating above the area of contact between the hoods and the cable jackets.

10. The method as claimed in claim 7, for an assembly wherein said two anchoring parts have different outer, threaded diameters, and wherein the ends of the sleeve are provided with different threaded inner diameters matching the respective threaded outer diameters of said anchoring parts, and wherein said sleeve is first screwed onto the anchoring part having the smaller outside threaded diameter, supporting studs are installed interiorly of the sleeve, and the sleeve is pulled back over the junction after the supporting studs have been installed and its opposite end is screwed onto the anchoring part having the larger outer threaded diameter.

* * * * *